Oct. 24, 1967 W. J. ZUG 3,349,386
BATTERY DISCHARGE INDICATOR
Filed March 2, 1965
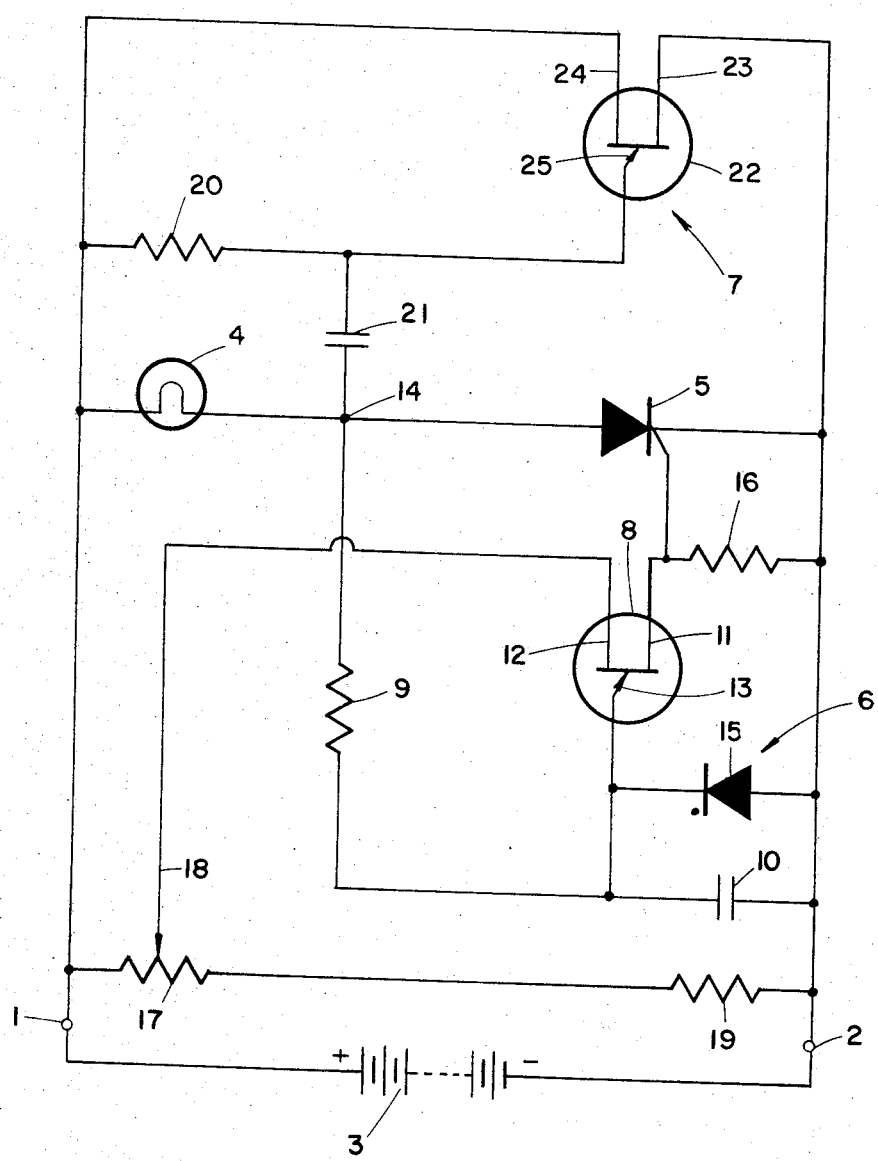

United States Patent Office 3,349,386
Patented Oct. 24, 1967

3,349,386
BATTERY DISCHARGE INDICATOR
Wilhelm J. Zug, Raleigh, N.C., assignor to The Electric Storage Battery Company, a corporation of New Jersey
Filed Mar. 2, 1965, Ser. No. 436,515
4 Claims. (Cl. 340—249)

The present invention generally relates to a battery discharge indicator. More specifically, the present invention is concerned with a device for indicating when the voltage of a battery has decreased to a predetermined value.

During the discharge of a battery the voltage generally decreases, and at some predetermined voltage, the battery can be considered to be discharged. In many applications, for example in industrial trucks, it is desirable to have an indication that the battery supplying power to the truck is approaching a state of complete discharge so that the vehicle can be returned to its charging station for battery recharge while there is still power available in the battery to get it there. Without such a warning device, the first indication could be complete battery discharge. This could occur a considerable distance from the vehicle charging station which might necessitate towing the vehicle to the charger or the transportation of a charger to the vehicle.

It is an object of the present invention to provide a novel solid state battery discharge indicator.

It is another object of the present invention to provide an indicator of the type described which is operative to indicate when the terminal voltage of a battery falls below a predetermined value.

A further object of the present invention is to provide a battery discharge indicator that can be used under extreme conditions of temperature, humidity, shock and vibration, and which has a very close differential between the "on" and "off" states.

In accordance with the present invention, these and other objects are accomplished in a solid state circuit which utilizes a lamp or other suitable low-current-drain indicating device to indicate that the battery voltage has reached a predetermined level. Current through the lamp is controlled by means of a silicon controlled rectifier or other suitable solid state switching element which operates as a switch under the control of a turn-on and a turn-off trigger circuit. The turn-on trigger circuit is responsive to the battery terminal voltage and is adapted to switch the silicon controlled diode into a conductive state to energize the indicating means when the battery voltage decreases to a predetermined value. The turn-off trigger circuit is arranged to bias the silicon controlled diode so that it is non-conductive and deenergizes the light once it has been turned on. Turn-on and turn-off trigger circuits are interconnected in such a manner that the action of one trigger circuit triggers the action of the other thus producing a pulsing of the light and a blinking light indication of a low state of battery charge once the battery voltage decreases to said predetermined value.

A better understanding of the present invention may be had from the following description when read with reference to the accompanying drawing which is a circuit diagram of a preferred embodiment of the present invention.

Referring now to the drawing, the battery discharge indicator of the present invention has a pair of input terminals 1 and 2 which are connected across the positive and negative terminals respectively of the battery 3 to indicate the state of discharge of that battery. For this purpose the circuit employs a lamp 4 or other suitable indicating means, which is connected across the terminals 1 and 2 by means of a silicon control rectifier 5. The current through the lamp 4 is controlled by the conduction of the silicon control rectifier 5 which is, in turn, triggered between conduction and non-conduction by the turn-on and turn-off circuit generally designated 6 and 7.

The turn-on circuit 6, which triggers the conduction of the silicon rectifier 5, employs a unijunction transistor 8, a resistor 9 and capacitor 10. The unijunction transistor 8 has the usual pair of bases 11 and 12 and emitter 13. As shown, the emitter 13 of the transistor 8 is connected to the junction of the resistor 9 and the capacitor 10 which in turn are connected in series between the negative terminal 2 and the circuit point 14. A Zener diode 15 is connected across the capacitor 10 to clamp the voltage across that capacitor to a fixed value. The bases 11 and 12 of the unijunction transistor 8 are connected across the terminals 1 and 2 by means of a resistor 16 and a portion of a variable resistor 17 as determined by a tape 18. The resistor 17 is part of a voltage divider which includes a resistor 19 connected in series with the resistor 17 across the terminals 1 and 2. The silicon controlled rectifier 5 is turned off by means of the turn-off circuit 7 comprising a resistor 20, a capacitor 21 and a unijunction transistor 22. The transistor 22 has the usual pair of bases 23 and 24 and an emitter 25. As shown, the emitter 25 of the transistor 22 is connected to the junction of the resistor 20 and the capacitor 21 which are connected between the circuit point 14 and the terminal 1. Bases 23 and 24 of the transistor 22 are connected across the circuit terminals 1 and 2.

In operation, when the terminals 1 and 2 are connected across a fully charged battery, the capacitor 10 is charged through the lamp 4 and the resistor 9 to a voltage determined by the breakdown voltage of the Zener diode 15. The voltage across the capacitor 10, and hence, the voltage across the emitter 13 and base 11 of the unijunction transistor 8, are held constant by the Zener diode 15. As long as this voltage is less than the peak-point voltage of the unijunction transistor 8 as defined by $Vp = \eta \times V_{BB}$, where $\eta$ is a constant and $V_{BB}$ is the interbase voltage of the transistor, the transistor 8 remains in its high resistance state. As the voltage across the terminals 1 and 2 decreases during battery discharge, the interbase voltage of the transistor 8 decreases proportionately since it is controlled by the voltage divider comprising the resistors 17 and 19. When this reaches a level such that the voltage across capacitor 10 is the peak point voltage of the transistor 8, that transistor will be switched into its low resistance state. The capacitor 10 will then discharge through the emitter base of the transistor 8 into the gate of the silicon controlled rectifier 5 turning it on. When the silicon controlled rectifier 5 is turned on, the lamp 4 is illuminated and the capacitor 21 will charge through the resistor 20. When the voltage across the capacitor 21 reaches the peak point voltage of the unijunction transistor 22, the resistance of the emitter-base path of that transistor decreases sharply. When this occurs the capacitor 21 discharges through the emitter-base path of the transistor 22, forcing the voltage at circuit point 14 more negative than the terminal 2 which switches the silicon controlled rectifier 5 back to its non-conductive state. The cycle is then repeated. The capacitor 10 is charged through the lamp 4 and the resistor 9; and, as long as the peak point voltage of the unijunction transistor 8 is equal to or smaller than voltage across the capacitor 10 as regulated by the Zener diode 15, the transistor 8 will be biased to its low-resistant state and the capacitor 10 will discharge into the gate of the silicon controlled rectifier 5 switching it into its conducting state. The silicon controlled rectifier 5 will remain conductive until turned off by the action of the turn-off circuit 7, and the lamp 4 will be turned alternately on and off to indicate that the voltage of the battery 3 is below a predetermined value and, hence, approaching complete discharge.

The battery voltage at which the lamp 4 will begin to blink can be adjusted by positioning the tap 18 on the resistor 17, the setting of which regulates the proportion of the battery voltage applied as inter-base bias to the transistor 8. The time constant of turn-on circuit is determined by the value of the resistor 9 and the capacitor 10; and the time constant for the turn-off circuit 7 is determined by the values of the resistor 20 and the capacitor 21. Inasmuch as the turn-off circuit 7 is so arranged that it switches on the turn-on circuit 6, the circuit has an inherent safe-failure feature.

By way of illustration, the following circuit components are typical of those which could be employed in the embodiment of the present invention shown in the drawing.

Resistor:
| | | |
|---|---|---|
| 9 | ohms | 15,000 |
| 16 | do | 47 |
| 17 | do | 1,000 |
| 19 | do | 4,700 |
| 20 | do | 68,000 |

Capacitor:
| | | |
|---|---|---|
| 10 | mfd | 10 |
| 21 | mfd | 1 |

Zener diode 15, 6 volt _____ 1N753
Unijunction transistor:
   8 _____ 2N2646
   22 _____ 2N2646
Silicon controlled rectifier 5 _____ C15F This embodiment of the invention is designated to indicate the state of discharge of a six-cell nominal 12-volt lead-acid battery. When adjusted to blink at a 10.6 volts, the differential between the "on" and "off" states was less than 0.1 volt. This differential was maintained over a temperature range of between 0° F. and 100° F. In addition, the only power required for the device is from the battery under surveillance and the current drain is low being only a few milliamperes when the light is not blinking. Another advantage of the device is that it is not damaged by a reverse polarity connection and has demonstrated good resistance to shock and vibration.

Having described this invention, that which is claimed as new is:

1. A battery discharge indicator comprising a pair of terminals adapted to be connected across the terminals of the battery under supervision, indicating means connected in series with a controlled switching element across said terminals, first circuit means including voltage regulating means connected to said switching element and said terminals and responsive to the difference between the voltage across said terminals and the voltage across said regulating means to supply a gating signal to said switching element to place said element in a state of conduction to energize said indicating means when the voltage across said terminals decreases to a predetermined value relative to the voltage across said voltage regulating means and second circuit means connected to said switching element and responsive to the conduction thereof to bias said element in a non-conductive state to deenergize said indicating means, the alternate energization and deenergization of said indicating means providing an indication that the voltage of said battery is below said predetermined value.

2. A battery discharge indicator comprising, in combination, a pair of terminals adapted to be connected across the battery under supervision, indicating means connected in series with a silicon controlled rectifier across said terminals, a first trigger circuit connected across said terminals and to the gate of said silicon controlled rectifier, said first trigger circuit comprising voltage regulating means and switching means connected to be responsive to the difference between the voltage across said terminals and the voltage across said voltage regulating means to supply a gating signal to said silicon controlled rectifier to render it conductive when said voltage across said terminals reaches a predetermined minimum voltage relative to the voltage across said voltage regulating means and a second trigger circuit connected across said terminals and to said silicon controlled rectifier to bias said rectifier non-conductive after it has been gated to conduction, the alternate energization and deenergization of said indicating means providing an indication that the voltage of said battery is below said predetermined value.

3. A battery discharge indicator comprising, in combination, a pair of terminals adapted to be connected across the battery under supervision, indicating means connected in series with a controlled switching element across said terminals, a first unijunction transistor having a pair of bases and an emitter, the bases of said first transistor being connected across said terminals, a first capacitor connected to the emitter of said transistor and to said indicating means to charge through said indicating means and to discharge into said emitter when the voltage across said terminals decreases to a predetermined value relative to the voltage across said capacitor to supply a gating signal to said switching element to place said element in a state of conduction to energize said switching means, a second unijunction transistor having a pair of bases and an emitter, the bases of said second transistor being connected across said terminals, a second capacitor connected to the emitter circuit of said second transistor and to said switching device to charge when said switching device is conductive and to discharge into the emitter circuit of said transistor and bias said switching element to a non-conductive state to deenergize said switching means, the alternate energization and deenergization of said indicating means providing an indication that the voltage of said battery is below said predetermined value.

4. A battery discharge indicator comprising, in combination, a pair of terminals adapted to be connected across the battery under supervision, indicating means connected in series with a controlled switching element across said terminals, a first unijunction transistor having a pair of bases and an emitter, a voltage divider, the bases of said first transistor being connected across said terminals through said voltage divider, a first capacitor connected to the emitter of said transistor and to said indicating means, voltage regulating means connected in parallel with said capacitor to clamp the voltage across said capacitor to a fixed value, said capacitor being operative to charge through said indicating means and to discharge into said emitter when the voltage across said terminals decreases to a predetermined value to supply a gating signal to said switching element to place said element in a state of conduction to energize said switching means, a second unijunction transistor having a pair of bases and an emitter, the bases of said second transistor being connected across said terminals, a second capacitor connected to the emitter circuit of said second transistor and to said switching device to charge when said switching device is conductive and to discharge into the emitter circuit of said transistor and bias said switching element to a non-conductive state to deenergize said switching means, the alternate energization and deenergization of said indicating means providing an indication that the voltage of said battery is below said predetermined value.

References Cited

UNITED STATES PATENTS 640,787    1/1900    Maxim _____ 340—249

NEIL C. READ, *Primary Examiner.*

D. MYER, *Assistant Examiner.*